W. P. JACKSON.

MOTOR CONTROL.

APPLICATION FILED FEB. 2, 1916.

Reissued Apr. 11, 1916. 14,104.

Inventor:
William P. Jackson,
by Albert G. Davis
His Attorney.

UNITED STATES PATENT OFFICE.

WILLIAM P. JACKSON, OF OAKLAND, CALIFORNIA, ASSIGNOR TO GENERAL ELECTRIC COMPANY, A CORPORATION OF NEW YORK.

MOTOR CONTROL.

14,104. Specification of Reissued Letters Patent. Reissued Apr. 11, 1916.

Original No. 1,077,717, dated November 4, 1913, Serial No. 704,412. Application for reissue filed February 2, 1916. Serial No. 75,835.

*To all whom it may concern:*

Be it known that I, WILLIAM P. JACKSON, a citizen of the United States, residing at Oakland, in the county of Alameda and State of California, have invented certain new and useful Improvements in Motor Controls, of which the following is a specification.

This invention relates to a system of speed control for direct current series motors, the principal object of which is to automatically control the field strength of such motor so that when accelerating and a certain predetermined speed is reached the field strength will be automatically reduced thereby further increasing the motor speed. Such a device is particularly applicable to traction cars enabling increased speeds to be obtained without increasing the gear ratio and thereby increasing the power consumption. This system is applied by either shunting the series field through a suitable resistance or by short circuiting some of the field which in either case reduces the field strength. The manner in which these objects and results are accomplished will be understood from the following specification and the accompanying drawing forming a part thereof.

Figure 1:
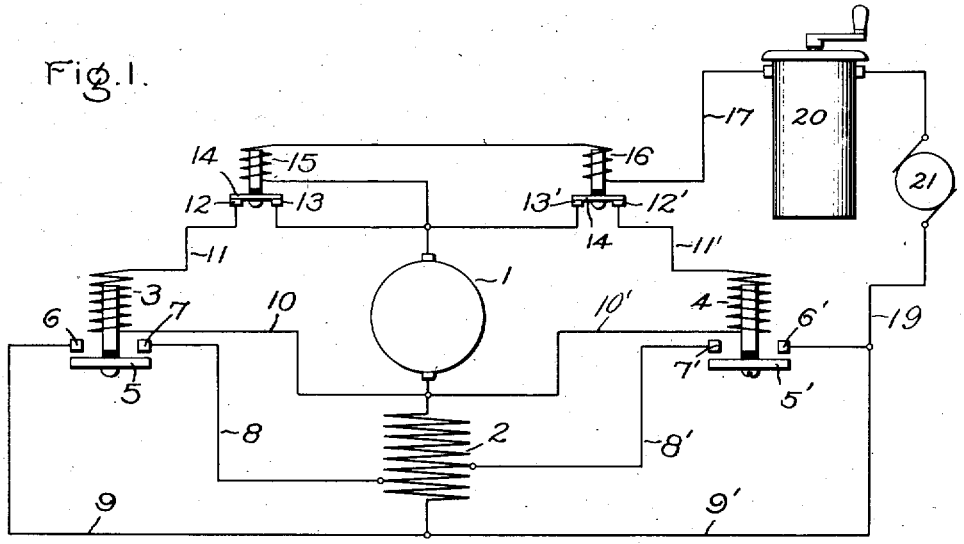
Figure 2:
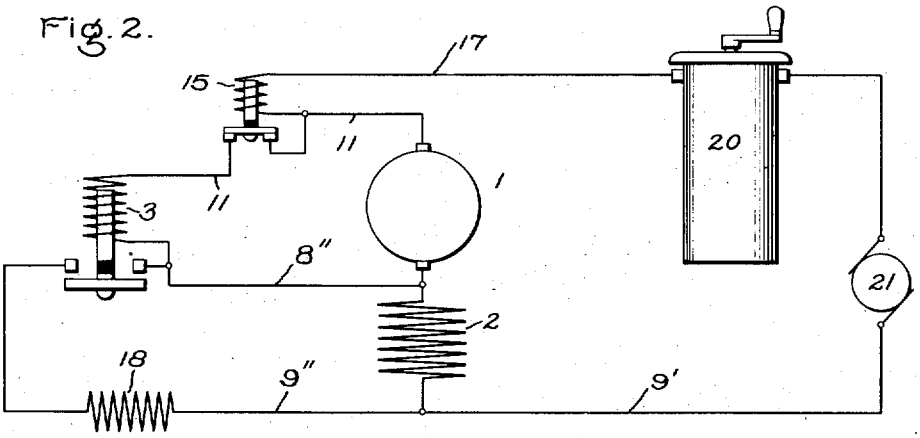

In the drawing, Figure 1 is a diagrammatical view showing the application of the system as arranged to short circuit turns of the series field. Fig. 2 is a diagrammatical view showing the application using a shunt around the series field.

In the drawings 1 denotes the armature of a series motor and 2 the series field thereof. In Fig. 1, solenoid controlled switches 3 and 4 are provided, to the armatures of which are attached conducting strips 5 and 5′ respectively, which make contact with terminals 6 and 7 and 6′ and 7′ respectively when the respective armatures are pulled up. Terminals 7 and 7′ are connected by conductors 8 and 8′ respectively with the coils of the series field at points intermediate the length thereof. Terminals 6 and 6′ are connected by conductors 9 and 9′ with the end of the field winding.

The coils of switches 3 and 4 each have one terminal connected by conductors 10 and 10′ to one armature terminal of motor 1, the other ends being connected through conductors 11 and 11′ to the other armature terminal. Thus, relays 3 and 4 will receive current in proportion to the impressed voltage across the armature terminals. Interposed in conductors 11 and 11′ are contacts 12 and 13, and 12′ and 13′ adapted to be closed by the contact yoke 14 of relays 15 or 16, the windings of which are connected directly in series and in series with the main current. Conductor 17 connects relay 16 with a controlling device 20 and thence to a source of current as 21.

In the form shown in Fig. 2 the contacts of switch 3 are connected through 8″ and 9″ to the terminals of the field coil 2, a suitable resistance 18 being placed in one of these conductors.

The operation of this system is as follows: When the circuit is closed through the controller 20 or any other suitable type of manually operated apparatus, current flows through conductors 17, relays 15 and 16 to armature 1, and thence through the field coils 2 through conductors 9′ and 19 to the generator 21. Immediately on the closing of this circuit, relays 15 and 16 pick up, opening the circuit through switches 3 and 4. This condition holds during acceleration and when the current begins to drop toward the end of the accelerating period relays 16 and 15 allow their armature to fall, closing circuits through switches 3 and 4 respectively. Now, the current through these switches will be proportional to the counter electromotive force across the armature terminals and hence to the armature speed. Thus switch 3 is adjusted to operate when the highest regular speed is reached to short circuit a number of turns of the field winding 2, thus decreasing the field strength and thereby increasing the speed. This increase of speed is then sufficient to operate switch 4 which closes a short circuit around a greater number of coils, thus further increasing the speed. In the form shown in Fig. 2 the same results are accomplished by introducing a shunt around the field which is closed by the action of relay 3. Thus, it will be seen that the device is automatic in that the increase of speed above a certain point takes place independent of the manual operation of the controller.

Having thus described the invention, what is claimed as new, is:—

1, The combination with a generator and motor; of a wire connecting one pole of said motor and the generator, one portion of said wire forming the series field winding of said motor, a solenoid having one end connected to said generator and the other end connected to the remaining pole of said motor, a core for said solenoid, a contact bar carried by said core, a pair of contacts engaged by said bar when the solenoid is deenergized, a wire connecting one of said pair of contacts with the connection from the solenoid to the motor, a wire connecting the remaining contact of the pair with the first mentioned wire between the series field winding and the armature of the motor, the last mentioned wire including a second solenoid, a core for the second solenoid, a contact bar carried by the second core, a pair of contacts engaged by said bar when the second solenoid is energized, a wire leading from one of the second pair of contacts to a point on the first mentioned wire between the series field winding and said generator, and a wire leading from the remaining contact of the second pair to one of the wires connected to the first mentioned pole of the motor.

2. The combination with a generator and motor; of a wire connecting one pole of said motor and the generator, one portion of said wire forming the series field winding of said motor, a solenoid having one end connected to said generator and the other end connected to the remaining pole of said motor, a core for said solenoid, a contact bar carried by said core, a pair of contacts engaged by said bar when the solenoid is deënergized a wire connecting one of said pair of contacts with the connection from the solenoid to the motor, a wire connecting the remaining contact of the pair with the first mentioned wire between the series field winding and the armature of the motor, the last mentioned wire including a second solenoid, a core for the second solenoid, a contact bar carried by the second core, a pair of contacts engaged by said bar when the second solenoid is energized, a wire leading from one of the second pair of contacts to a point on the first mentioned wire between the series field winding and said generator, and including a resistance, and a wire connecting the remaining contact of the second pair with the wire connecting the second solenoid and the motor.

3. The combination in a motor control system of a motor having a series field, a source of current for said motor, circuit connections including a switch responsive to the counter electromotive force across the armature terminals of said motor for decreasing the field strength of said motor, and a relay responsive to the current in the motor circuit for operatively connecting said switch across the motor armature when the current in the motor circuit drops to a predetermined value.

In witness whereof, I have hereunto set my hand this 21st day of January 1916.

WILLIAM P. JACKSON.